United States Patent [19]
Shirakura et al.

[11] Patent Number: 4,939,614
[45] Date of Patent: Jul. 3, 1990

[54] MAGNETIC DISK MEDIUM WITH CIRCUMFERENTIALLY TEXTURED SURFACES AND VARIED SURFACE ROUGHNESS AND METHOD OF PRODUCING THE SAME

[75] Inventors: Takaaki Shirakura, Chigasaki; Shinya Matsuoka; Hiroshi Yashiki, both of Odawara; Masanori Arayashiki, Hadano; Masaki Ohura, Odawara, all of Japan

[73] Assignee: Hitachi, Ltd., Tokyo, Japan

[21] Appl. No.: 175,527

[22] Filed: Mar. 31, 1988

[30] Foreign Application Priority Data

Apr. 3, 1987 [JP]   Japan ................................. 62-83466

[51] Int. Cl.$^5$ ............................................. G11B 5/82
[52] U.S. Cl. .................................................. 360/135
[58] Field of Search .................... 360/135, 133, 97.01; 29/527.2; 428/328, 394

[56] References Cited

U.S. PATENT DOCUMENTS 4,419,701 12/1983 Harrison et al. ................ 360/77.08
4,488,189 12/1984 Axmear et al. .................. 360/78.06

FOREIGN PATENT DOCUMENTS 2948845 7/1980 Fed. Rep. of Germany ...... 360/135
54-23508 4/1979 Japan .
60-40530 3/1985 Japan .................................... 360/135
61-3322 1/1986 Japan ................................. 360/97.01

Primary Examiner—John H. Wolff
Attorney, Agent, or Firm—Kenyon & Kenyon

[57] ABSTRACT

A magnetic disk medium in which texture working is performed on surfaces of a substrate or on surfaces of subbing films provided on the substrate to attain circumferential worked-traces so that the contact start stop area thereof is different from the recording/reproducing area thereof in roughness of the worked surfaces.

24 Claims, 3 Drawing Sheets

MAGNETIC DISK MEDIUM WITH CIRCUMFERENTIALLY TEXTURED SURFACES AND VARIED SURFACE ROUGHNESS AND METHOD OF PRODUCING THE SAME

BACKGROUND OF THE INVENTION

The present invention relates to a magnetic disk medium and a method of producing the same. Particularly, the invention relates to a magnetic disk medium in which the attraction between a magnetic head and the magnetic disk medium when the magnetic disk medium stops can be reduced and in which the circumferential magnetic characteristics thereof can be equalized, and a method of producing the same.

Heretofore, working for forming substantially concentrically worked traces 33 (hereinafter called "texture working") on surfaces of a substrate or on N-P-plated subbing films provided on the surfaces of the substrate as shown in FIG. 1 has been carried out in magnetic disk media, especially thin film disk media such as sputtered disks, plated disks and the like.

Generally, the carrying out of the texture working brings about the following effects:

(i) Attracting force due to a sucking phenomenon between a magnetic head and a magnetic disk medium when the magnetic disk medium stops is reduced;

(ii) Magnetic films formed on the texture-worked surfaces are made to have shape-anisotropy so that the circumferential magnetic characteristics thereof are equalized; and so on.

However, carrying out only the texture working has been not sufficient to reduce the attracting force when the disk medium stops.

The attracting force and the directional property which make the surface accuracy of the disk medium rough have the following relation.

For example, in the case where worked traces are formed in the radial direction of a magnetic disk medium, that is, in the direction perpendicular to the acting direction of the attracting force when the magnetic disk medium starts, the effect of reduction of the attracting force is less than the case where the worked traces are formed in the circumferential direction of the magnetic disk medium. In order to attain the same effect as the latter case, the disk surfaces must have average roughness $R_a$ not less than 100 nm. However, the value of this roughness will shorten the life of the CSS area of the disk medium.

Further, in the case where the texture working is made, the roughness of the texture working is antinomically limited as follows.

FIG. 3 is a graph view showing relations among floating height $H_o$ of a magnetic head from a magnetic recording disk medium when the magnetic head comes into contact with the rotating magnetic recording disk medium, attracting force F of the magnetic head acting on the magnetic recording medium when the magnetic recording medium stops, and average surface roughness $R_a$ of the magnetic recording medium.

In order to lower the floating height $H_o$ of the magnetic head when the magnetic head comes into contact with the rotating magnetic disk medium, it is necessary to reduce the surface roughness of the magnetic disk medium. For example, in the case where the floating height $H_o$ is established to be 0.2 $\mu$m, it is necessary to make the average roughness $R_a$ substantially satisfy the condition $R_a \leq 25$ nm.

On the other hand, the attracting force F between the magnetic head and the magnetic disk medium when the disk medium stops becomes $F \geq 20$ gf when the relation $R_a \leq 25$ nm is satisfied. Accordingly, a problem arises in that magnetic head bearing springs are deformed when the magnetic disk medium starts. For the purpose of eliminating the problem, the attracting force must have a value not larger than 5 gf, and in this condition, it is necessary to make the average surface roughness $R_a$ of the magnetic disk medium be not less than 50 nm. If the value of $R_a$ is so large as described above, the floating height of the head becomes too much.

As described above, it is difficult to establish the roughness of the texture working to be suited to the two values of F and $H_o$.

Further, a method for preventing the attracting force has been proposed as described in Japanese Patent Unexamined Publication No. 54-23508. According to the proposed method, the plane accuracy of a contact start stop area 42 (hereinafter abbreviated to "CSS area") on the coating type magnetic disk medium is relatively lowered compared with that of a recording/reproducing area 41 to thereby reduce the attracting force between the head and the disk medium at the CSS area. However, the directional property for roughing the plane accuracy is not defined in the proposed method.

Further, the proposed method does not give any specific suggestion as to the relations among the attracting force F, the average roughness $R_a$ and the floating height $H_o$, and does not give any suggestion as to a specific value of $R_a$.

SUMMARY OF THE INVENTION

It is therefore an object of the present invention to solve the aforementioned problems in the prior art.

It is another object of the present invention to provide a magnetic disk medium in which the attracting force between a magnetic head and the medium when the medium stops can be reduced.

It is a further object of the present invention to provide a magnetic disk medium in which the circumferential magnetic characteristics can be equalized.

The foregoing and other objects of the present invention are attained by a magnetic disk medium in which texture working is performed in surfaces of a substrate or in surfaces of subbing films provided on the substrate to form circumferential worked-traces so that the CSS area thereof is different from the recording/reproducing area thereof in roughness of the worked surfaces.

According to the present invention, the degree of roughness in the texture working is changed so as to make the working accuracy of the recording/reproducing area higher than that of the CSS area. Accordingly, not only the floating height of the magnetic head can be suitably reduced while the contact between the head and the medium can be prevented, but also the attracting force between the head and the medium at the CSS area can be reduced.

DETAILED DESCRIPTION OF THE PREFERRED INVENTION

Embodiments of the present invention will be described hereunder with reference to the accompanying drawings.

Figure 4:
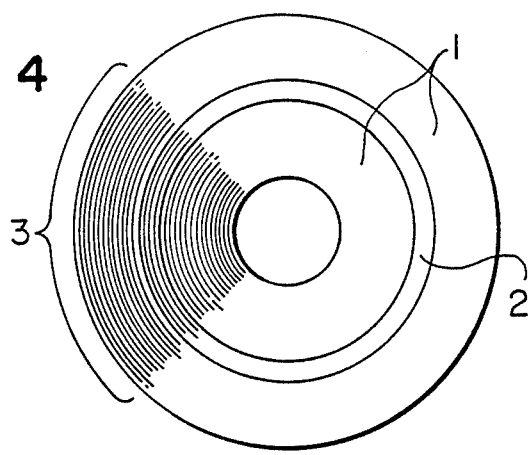
FIG. 4 is a plan view of a magnetic disk medium as an embodiment of the present invention.
Figure 5A:
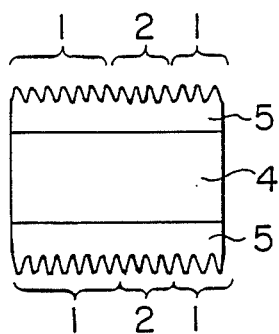
FIGS. 5A, 5B and 5C are views respectively for explaining a method of working a magnetic disk medium as another embodiment of the present invention.
Figure 5B:
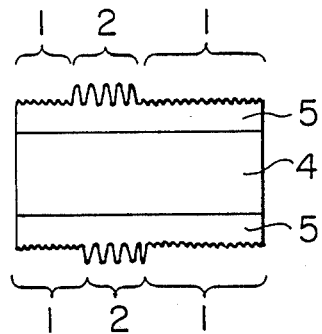
Figure 5C:
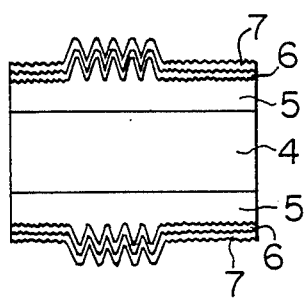
Figure 6:
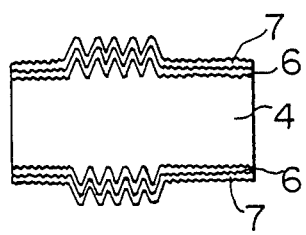
FIG. 6 is a sectional view of a magnetic disk medium as a further embodiment of the present invention.

FIG. 4 is a plan view of a magnetic disk medium as an embodiment of the present invention. FIGS. 5A, 5B and 5C are sectional views showing a magnetic disk medium for explaining a method of working the magnetic disk medium as another embodiment of the present invention.

Preferably, magnetic disk media used in the present invention are thin film disks, such as sputtered disks, plated disks and the like.

In this embodiment, first opposite surfaces of an aluminum substrate 4, worked to attain a predetermined value of surface roughness, are plated with Ni-P as recording medium layers 5 to prepare a magnetic disk medium as shown in FIG. 5A. Next, the whole surfaces (that is, a CSS area 2 and a recording/reproducing area 1) of the recording medium layers 5 are ground while the magnetic disk medium is rotated, so that for example the average roughness $R_a$ thereof is made to be within a range of from about 50 nm to about 70 nm. Next, texture working is carried out on the whole surfaces of the recording medium layers in the circumferential direction of the magnetic disk medium.

Further, as shown in FIG. 5B, only the recording/reproducing area 1 of the recording medium layers 5 is ground while the magnetic disk medium is rotated, so that for example the average roughness $R_a$ thereof is made to be within a range of from about 5 nm to about 10 nm. Next, texture working is carried out on the recording/reproducing area 1 in the circumferential direction of the magnetic disk medium in the same manner as described above to thereby remove minute projections from the recording/reproducing area 1. Furthermore, as shown in FIG. 5C, magnetic films 6 and protective films 7 are successively formed on the subbing films. The films 6 and 7 are so thin that the roughness of the disk surface thereof is equalized to that of the recording medium layers 5.

Thus, a magnetic disk medium as shown in FIG. 4, which is worked by texture working to form worked traces 3 in its whole surfaces and in which the plane accuracy ($R_a$=5-10nm) of the recording/reproducing area 1 is higher than that of the CSS area 2, is prepared.

Figure 1:
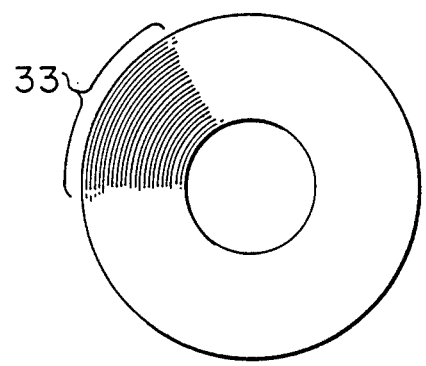
FIG. 1 is a plan view of a conventional disk medium worked by texture-working.
Figure 2:
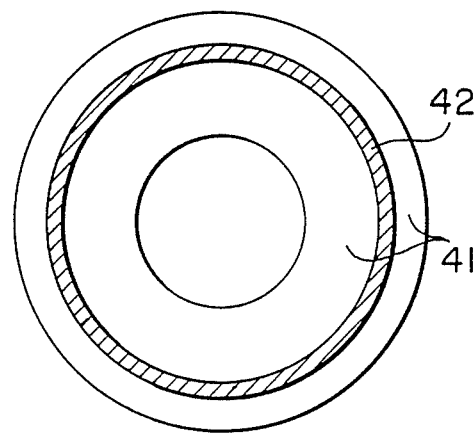
FIG. 2 is a plan view of another conventional disk medium in which the CSS area is different from the recording/reproducing area in plane accuracy.
Figure 3:
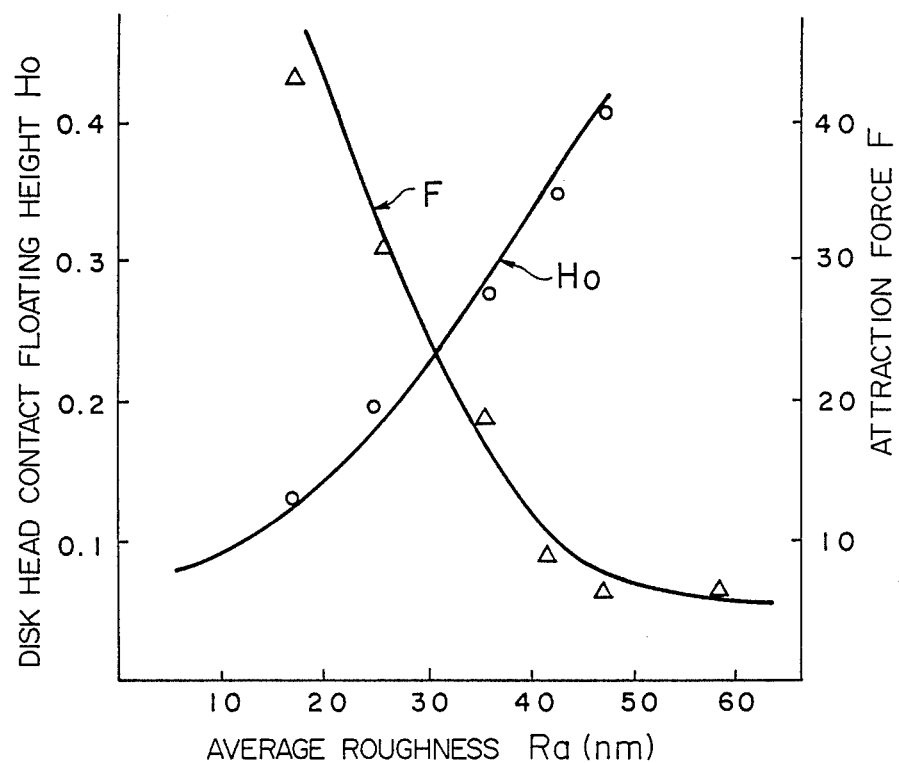
FIG. 3 is a graph view showing relations among floating height $H_o$ of a magnetic head when the head comes into contact with a rotating magnetic recording disk medium, attracting force F of the head acting on the magnetic disk medium when the magnetic disk medium stops, and average surface roughness $R_a$ of the magnetic disk medium.

Accordingly, it is apparent from FIG. 3 that the floating height $H_o$ of the magnetic head when the magnetic head comes into contact with the rotating magnetic recording disk medium at the recording/reproducing area 1 can be reduced to be about 0.1 μm, and that the attracting force F of the head acting on the medium when the disk medium stops can be reduced to be not larger than 5 gf.

As described above, according to the present invention, because the average roughness $R_a$ of the CSS area is made to fall within a range of from about 50 nm to about 70 nm, the attracting force F between the magnetic head and the magnetic disk medium when the disk medium stops can be reduced sufficiently. Further, because the average roughness of the recording/reproducing area is made to fall within a range of from about 5 nm to about 10 nm, the floating height of the magnetic head when the disk medium is rotated can be reduced sufficiently while the attraction can be prevented. Furthermore, because the texture working is performed to the disk medium to form worked traces in the circumferential direction thereof, the magnetic films can have shape anisotropy so that the circumferential magnetic characteristics can be equalized.

Although this embodiment has shown the case where the texture working is subjected to the subbing films provided on the surfaces of the disk medium substrate, the present invention is applicable to the case where the texture working is directly performed on the surfaces of the substrate.

What is claimed is:

1. A magnetic disk medium for use in a magnetic disk apparatus, comprising:
   a circumferentially textured substrate;
   magnetic films provided on said surfaces of said substrate;
   protective films provided on said magnetic films;
   said substrate having surface roughness which varies in the radial direction of said disk medium.

2. A magnetic disk medium according to claim 1, in which said substrate includes a recording/reproducing area and a contact start stop area, said recording/reproducing area having plane accuracy higher than that of said contact start stop area.

3. A magnetic disk medium according to claim 2, in which average roughness in said recording/reproducing area is within a range of from 5 nm to 10 nm, and in which average roughness in said contact start stop area is within a range of from 50 nm to 70 nm.

4. A magnetic disk medium according to claim 1, in which said magnetic disk medium is a thin film disk medium.

5. A magnetic disk medium according to claim 1, in which said magnetic films have shape anisotropy.

6. A magnetic disk medium according to claim 1, wherein average roughness in a recording/reproducing area of said substrate, said protective films and said magnetic films is within a range of from 5 nm to 10 nm, and average roughness in a contact start stop area of said substrate, said protective films and said magnetic films is within a range of from 50 nm to 70 nm.

7. A magnetic disk medium for use in a magnetic disk apparatus, comprising:
   a substrate;
   circumferentially textured subbing films provided on said substrate;
   magnetic films provided on said subbing films;
   protective films provided on said magnetic films;
   said subbing films having surface roughness which varies in the radial direction of said disk medium.

8. A magnetic disk medium according to claim 6, in which each of said subbing films includes a recording/reproducing area and a contact start stop area, said recording/reproducing area having plane accuracy higher than that of said contact start stop area.

9. A magnetic disk medium according to claim 8, in which average roughness in said recording/reproducing area is within a range of from 5 nm to 10 nm, and in which average roughness in said contact start stop area is within a range of from 50 nm to 70 nm.

10. A magnetic disk medium according to claim 7, in which said magnetic disk medium is a thin film disk medium.

11. A magnetic disk medium according to claim 7, in which said magnetic films have shape anisotropy.

12. A magnetic disk medium according to claim 7, wherein average roughness in a recording/reproducing area of said subbing films, said protective films and said magnetic films is within a range of from 5 nm to 10 nm and average roughness in a contact start stop area of said subbing films, and protective films and said magnetic films is within a range of from 50 nm to 70 nm.

13. A method of producing a magnetic disk medium, comprising the steps of:
  forming worked traces in surfaces of a substrate in a circumferential direction of said disk;
  grinding surfaces of said substrate to attain average roughness within a predetermined first range;
  grinding a recording/reproducing area of each of said surfaces of said substrate to attain average roughness within a predetermined second range in a recording/reproducing area of said disk medium;
  forming magnetic films onto said surfaces of said substrate; and
  forming protective films onto said magnetic films.

14. A method of producing a magnetic disk medium according to claim 13, in which said average roughness within said first range is larger than that within said second range.

15. A method of producing a magnetic disk medium according to claim 14, in which said average roughness within said first range is from 50 nm to 70 nm, and in which said average roughness within said second range is from 5 nm to 10 nm.

16. A method of producing a magnetic disk medium according to claim 13, in which said magnetic disk medium is a thin film disk medium.

17. A method of producing a magnetic disk medium according to claim 13, in which said magnetic films have shape anisotropy.

18. A magnetic disk medium according to claim 13, wherein average roughness in a recording/reproducing area of said substrate, said protective films and said magnetic films is within a range of from 5 nm to 10 nm, and average roughness in a contact start stop area of said substrate, said protective films and said magnetic films is within a range of from 50 nm to 70 nm.

19. A method of producing a magnetic disk medium, comprising the steps of:
  forming subbing films onto a substrate;
  forming worked traces in a surface of said subbing films in a circumferential direction of the disk;
  grinding surfaces of said subbing films to attain average roughness within a predetermined first range;
  grinding a recording/reproducing area of each of said surfaces of said subbing films to attain average roughness within a predetermined second range;
  forming magnetic films onto said surfaces of said subbing films; and
  forming protective films onto said magnetic films.

20. A method of producing a magnetic disk medium according to claim 19, in which said average roughness within said first range is larger than that within said second range.

21. A method of producing a magnetic disk medium according to claim 20, in which said average roughness within said first range is from 50 nm to 70 nm, and in which said average roughness within said second range is from 5 nm to 10 nm.

22. A method of producing a magnetic disk medium according to claim 19, in which said magnetic disk medium is a thin film disk medium.

23. A method of producing a magnetic disk medium according to claim 19, in which said magnetic films have shape anisotropy.

24. A magnetic disk medium according to claim 19, wherein average roughness in a recording/reproducing area of said subbing films, said protective films and said magnetic films is within a range of from 5 nm to 10 nm, and average roughness in a contact start stop area of said subbing films, said protective films and said magnetic films is within a range of from 50 nm to 70 nm.

* * * * *

UNITED STATES PATENT AND TRADEMARK OFFICE
CERTIFICATE OF CORRECTION

PATENT NO.   : 4,939,614
DATED        : 3 July 1990
INVENTOR(S)  : T. SHIRAKURA et al.

It is certified that error appears in the above-identified patent and that said Letters Patent is hereby corrected as shown below:

| Column | Line | |
|--------|------|--|
| 3 | 17 | Change "PREFERRED" to --PRESENT--. |

Signed and Sealed this

Tenth Day of December, 1991

Attest:

HARRY F. MANBECK, JR.

*Attesting Officer*         *Commissioner of Patents and Trademarks*